United States Patent [19]
Bochenek

[11] Patent Number: 5,627,411
[45] Date of Patent: May 6, 1997

[54] SWITCHING CIRCUIT WITH LOCKOUT FEATURE

[75] Inventor: Jeffrey Bochenek, Dearborn, Mich.

[73] Assignee: Atoma International, Inc., Farmington Hills, Mich.

[21] Appl. No.: 530,496

[22] Filed: Sep. 19, 1995

[51] Int. Cl.⁶ .................................................... H02P 1/22
[52] U.S. Cl. .................................... 307/10.1; 318/283
[58] Field of Search .................................... 307/9.1, 10.1, 307/112, 113, 115, 125, 139, 143, 140, 142; 200/5 R; 318/283, 267; 180/321–323, 289, 281

[56] References Cited

U.S. PATENT DOCUMENTS

| | | | |
|---|---|---|---|
| 3,688,173 | 8/1972 | Ballou | 318/267 |
| 4,146,826 | 3/1979 | Wojslawowicz | 307/10.1 |
| 5,149,924 | 9/1992 | Priesemuth | 200/5 R |

*Primary Examiner*—Richard T. Elms
*Attorney, Agent, or Firm*—Pennie & Edmonds

[57] ABSTRACT

An electrical circuit for a switch having a lockout feature is described. The circuit permits both a primary operator and an auxiliary operator to operate a bi-directional motor by activating separate low-current switches. The circuitry enables the primary operator to disable the auxiliary operator's ability to operate the motor by activating a lockout switch. With the lockout switch activated, the primary operator can operate the motor without interference from the auxiliary operator. High-current power switches, activated via logic circuitry rather than by the operators, are used to complete a power circuit for energizing the motor.

20 Claims, 3 Drawing Sheets

SWITCHING CIRCUIT WITH LOCKOUT FEATURE

BACKGROUND

The present invention relates to an electrical circuit having a switchable lockout feature whereby a primary operator can selectively enable or disable an auxiliary operator's ability to operate an actuator also controllable by the primary operator. While a circuit in accordance with the invention has many uses, it is particularly well suited to raising and lowering power windows in passenger vehicles.

Many passenger vehicles are equipped with power window systems. The windows in many such systems are operated by double pole double throw rocker switches. Throwing (i.e., activating) the rocker switch in one direction raises the corresponding window and activating it in the other lowers that window. A passenger is provided with an auxiliary switch that operates his or her own window. The driver, on the other hand, is provided with a driver's window switch and a plurality of primary switches to operate each of the passenger windows. Oftentimes, the driver is also provided with a separate lockout switch to prevent the passengers from operating their respective windows. When activated, these lockout switches still allow the driver to operate the windows no longer operable by the passengers.

FIG. 1 shows a schematic of a simplified prior art power window system having, for the purposes of explanation, only a single passenger window. The driver's switchplate 10 includes a normally closed lockout switch 12 with which the driver may disable the passenger's auxiliary switch 20. The driver's switchplate 10 also has a primary switch 14 to operate the passenger's bi-directional window motor 28. When the lockout switch 12 is closed, the auxiliary switch power terminal 22 is supplied with power. The auxiliary switch 20 may then be operated by the passenger to raise or lower the window. On the other hand, when the lockout switch 12 is open, power is not supplied to the auxiliary switch power terminal 22 and the passenger cannot operate the window.

The driver's ability to operate the passenger's window is independent of the setting of the lockout switch 14. This is because the driver's primary switch 14 supplies power to the passenger's window through an alternate path, using primary switch power terminal 18 which provides power as long as the ignition is on. A driver wishing to operate the passenger's window activates the primary switch 14, which outputs current through primary switch power terminal 18, through one of the normally closed auxiliary switch contacts 24, 26, through the window motor 28, through the other of the normally closed auxiliary switch contacts 24, 26 and then on to ground.

The power window system described above has a number of drawbacks. One of these is that a passenger can interfere with the driver's operation of the passenger's window even when the lockout switch 12 has been activated (opened). This is because electrical continuity must be maintained between the auxiliary switch contacts 24, 26 for the driver to operate the passenger's window. If a passenger were to fiddle with the auxiliary switch 20, he or she would break this continuity and thus interfere with the driver's operation of the passenger's window.

Another problem with the prior art window control circuits is that the power to operate a passenger's window passes through a driver's switchplate, imposing requirements which increase their cost and complexity. One such requirement is that a bi-directional window motor needs a current on the order of 10 to 20 amperes. This requires relatively expensive high-current switches to provide power to a window motor via mechanical contacts. It also necessitates the use of thicker gage wires, adding to both the cost and weight of the wire harness used in such a system. And third, in high-current switch systems, there is significant voltage drop as the current flows from the driver door to the passenger's window motor. In some vehicles, this results in passenger's window operating at a noticeably slower rate than the driver's window. The voltage drop may be lessened by using larger gage wire, but this would increase both cost and weight.

Lastly, existing designs, typified by the circuit shown in FIG. 1, require that the power wires to the passenger's window motor be run through the driver's switchplate. This requires more wiring and splices (thus increasing both circuit cost and circuit complexity) than if the power wires were directly supplied to the passenger's window motor.

SUMMARY

The present invention is an electrical circuit for a switch with a lockout feature that offers a number of advantages over related prior art devices. First, this invention permits a primary operator (e.g., a driver) to lock out the auxiliary operator (e.g., a passenger) and yet operate the powered device (e.g., window motor) without interference from the auxiliary operator. Second, unlike the high-current mechanical switches now in use, the present invention calls for both the primary operator and the auxiliary operator(s) to activate separate low current mechanical switches to energize the powered device. This feature generally reduces the cost, weight and complexity of the various components used in existing designs. In the present invention, high-current switching is performed by power switches responsive to inputs from the low-current lockout and mechanical switches.

In the context of power window switches having a lockout feature, the present invention offers a number of benefits. First, it obviates the need for power wires to be run through the driver's door to a passenger's window motor. Second, it prevents a passenger from interfering with the driver's operation of the passenger's window when the lockout switch has been activated (opened). And third, it reduces the cost and weight of the wiring harnesses needed to implement a power window system, allowing one to run just two control lines from the driver's circuitry to a passenger's door.

A device made in accordance with the present invention allows both driver and passenger to activate low current mechanical switches which conduct currents less than 20 mA. High current switching is performed by mechanical or solid state relays or other equivalent components situated proximate to the motor being actuated. Therefore, the high-current switches are not directly accessible to either the driver or the passenger.

All of the above benefits are realized by the present invention's circuit which selectively activates a bi-directional motor in a first or a second direction. A general embodiment includes a power source, a bi-directional motor, a lockout switch switchably outputting an ON and an OFF lockout signal, a first primary switch switchably outputting an ON and OFF first primary output signal, a second primary switch switchably outputting an ON and OFF secondary output signal, a first auxiliary switch switchably outputting an ON and an OFF first auxiliary signal, and a second auxiliary switch switchably outputting an ON and an OFF second auxiliary signal. Also included is a first primary circuit which outputs a first tri-state signal responsive to the lockout signal and the first primary signal, a second primary circuit which outputs a second tri-state signal responsive to the lockout signal and the second primary signal, a first auxiliary circuit which outputs a first switching signal responsive to the first auxiliary signal and the first tri-state signal, a second auxiliary circuit which outputs a second switching signal responsive to the second auxiliary signal and the second tri-state signal. Lastly, the circuit includes first and second power switches receiving inputs from the first and second switching signals, the power switches connecting a power supply to two terminals of the bidirectional motor to provide the latter with power.

The circuit summarized above allows either a primary or an auxiliary user to operate the reversible motor in either a first or a second direction. The circuit also provides the primary operator with a lockout switch to prevent the auxiliary operator from operating the motor. Outputting dual tri-state signals from the primary circuit requires only two wires, neither of which are power wires, from the primary to the secondary circuits. This contrasts with the three lines necessary in current designs, as shown in FIG. 1, saving the cost and reducing the weight of the required wiring harness. Using tri-state signals allows three modes of operation at the auxiliary circuit: lockout OFF which enables the auxiliary operator to operate the motor, lockout ON with the primary operator not activating either primary switch, which disables the auxiliary operator from operating either auxiliary switch, and lockout ON with the primary operator activating one of the two primary switches without enabling the auxiliary operator to activate the auxiliary switch which operates the motor in the opposite direction. Because, in this circuit, all high-current switching is done by components not directly activated by either operator, only low-current switches need be provided to the operators, further saving on costs.

DETAILED DESCRIPTION OF THE INVENTION

Figure 1:
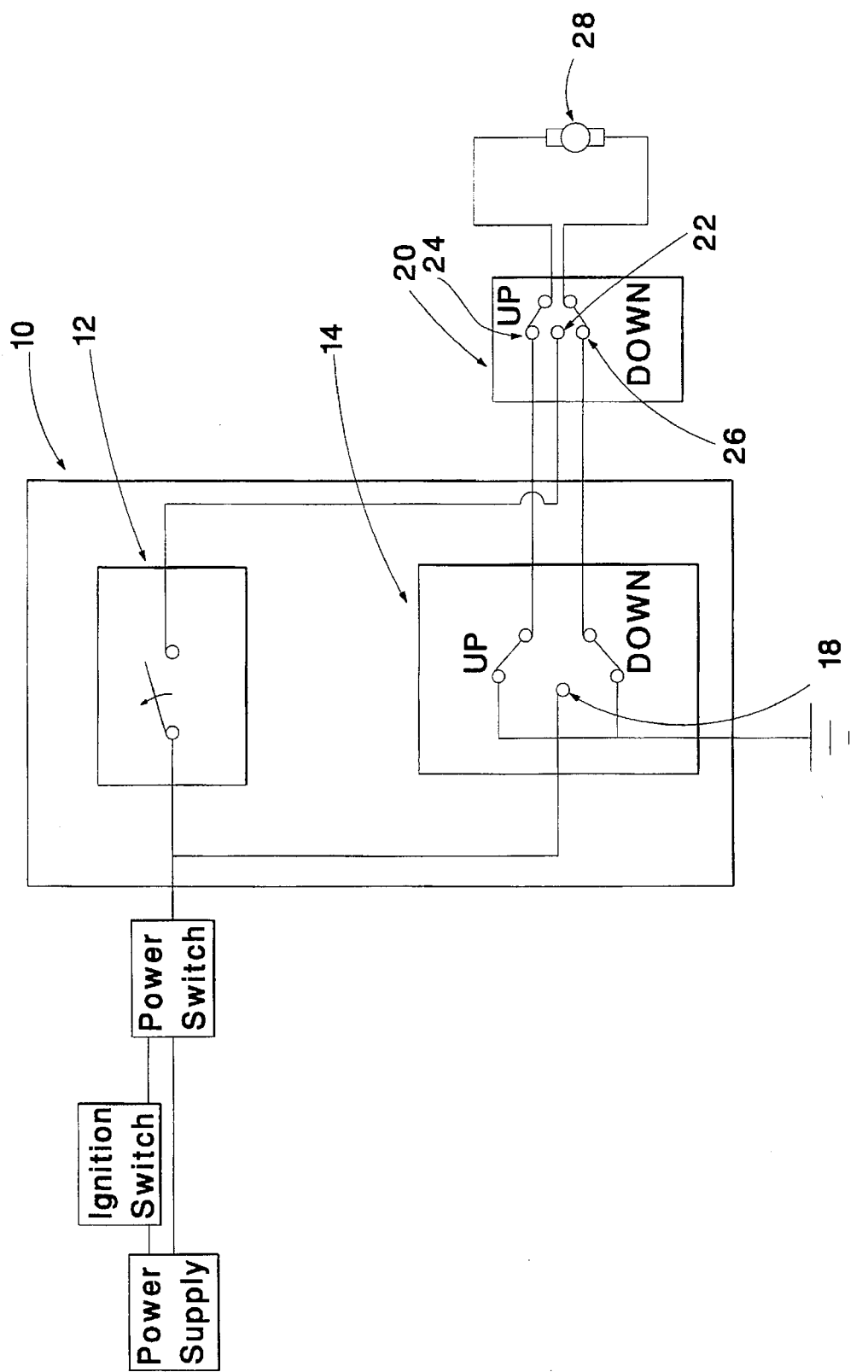
FIG. 1 is a schematic of a prior art circuit to control a power window motor.
Figure 2:
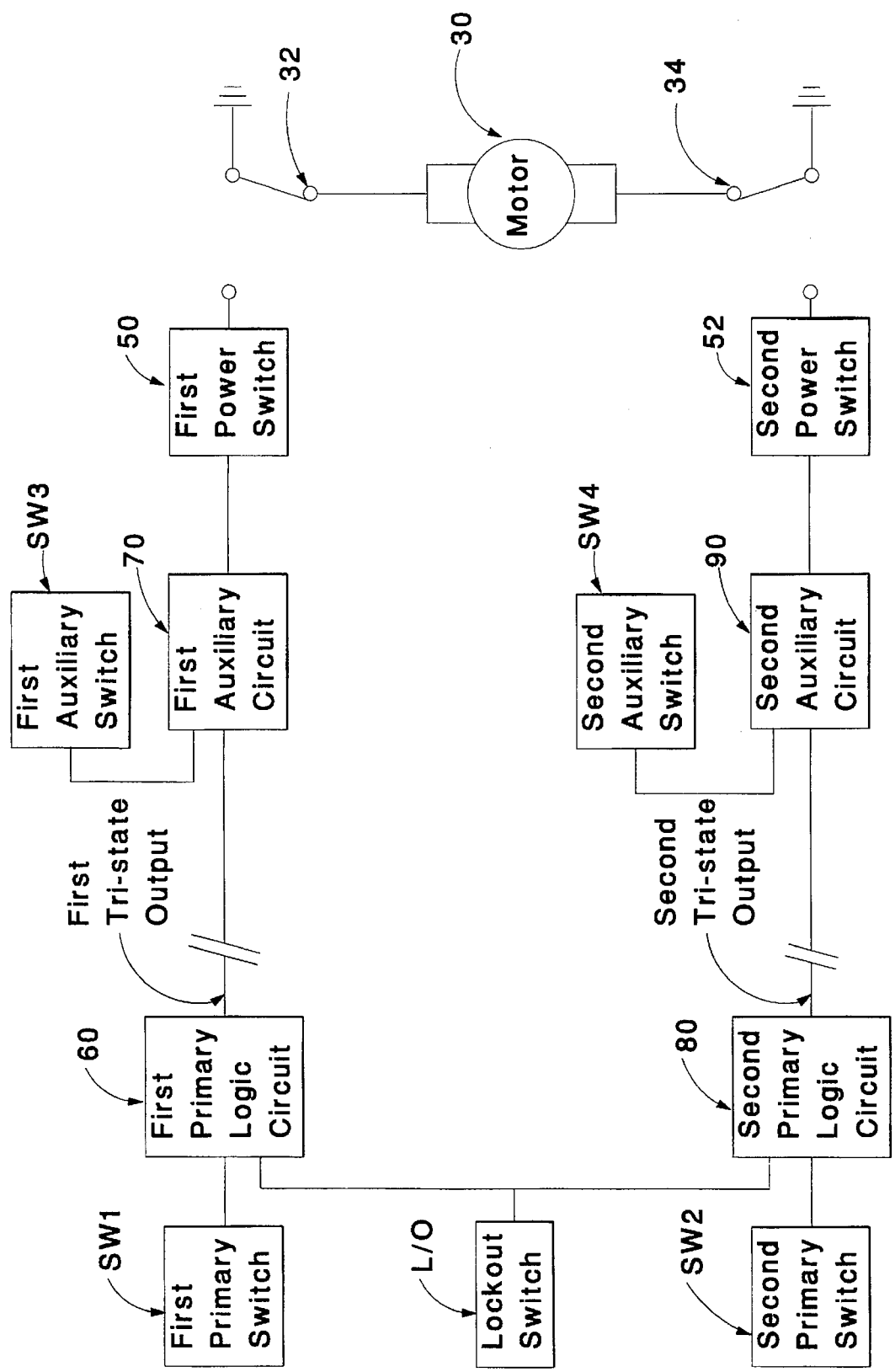
FIG. 2 is a block diagram of the present invention.

Referring to FIG. 2, a circuit in accordance with the present invention provides a primary operator with a low-current mechanical lockout switch L/O and first and second low-current primary switches SW1, SW2. In this embodiment, all three of these switches are normally OFF (open). Closing (i.e., turning ON) one of the two primary switches SW1, SW2 allows the primary operator to operate the bi-directional motor 30 in a first or a second direction, respectively. As explained further below, the first and second primary logic circuitry 60, 80 enables the primary operator to operate the motor regardless of the setting of the lockout switch L/O. Because the motor may only be operated in one direction at any instant, the first and second primary switches SW1, SW2 preferably are mutually exclusive; i.e., only one of them can be activated at a time. This can be ensured, for instance, by using a double throw contact (i.e., non-latching) switch, preferably a rocker type. The lockout switch L/O, in contrast, is preferably a latching single throw switch.

The circuit also provides an auxiliary operator with normally OFF, low-current first and second auxiliary switches SW3, SW4, respectively° So long as the lockout switch L/O is not activated, an auxiliary operator can operate the bi-directional motor 30 in a first or a second direction by activating one of low-current first and second auxiliary switches SW1 and SW2, respectively. As is the case with first and second primary switches, first and second auxiliary switches SW3, SW4 preferably are mutually exclusive and also may be combined into a second double throw contact rocker switch.

First and second primary logic circuits 60, 80 both receive an input from the lockout switch L/O. Each also receives a second input from corresponding first and second primary switches SW1, SW2, respectively. First and second primary logic circuits 60, 80 supply a tri-state output in response to the setting of the lockout switch L/O and activations of first and second primary switches SW1, SW2. For the purposes of this disclosure, the three states are labeled HI, LO and X. A primary logic circuit's output is HI whenever the corresponding primary switch is activated (ON) regardless of the status of the lockout switch L/O; its output is LO when the lockout switch L/O is activated (ON) and the corresponding primary switch is not activated (OFF); and its output is X if both the lockout switch L/O and the corresponding primary switch are not activated (OFF). Because first and second primary switches SW1, SW2 are preferably mutually exclusive, outputs from first and second primary logic circuits 60, 80 cannot simultaneously be HI. They may, however, both be LO or X.

The first and second auxiliary logic circuits 70, 90 each receive two inputs. One input to each is the aforementioned tri-state output from corresponding first and second primary logic circuit 60, 80, respectively. The second input to first and second auxiliary logic circuits 70, 90 is from normally OFF first and second auxiliary switch SW3, SW4, respectively. The first and second auxiliary logic circuits 70, 90 each supply a signal having a two-level output (ON or OFF), the output level being determined by the inputs received by each. An auxiliary logic circuit's output level is ON in two instances: 1) whenever its tri-state input is HI and 2) when its tri-state input is X and the corresponding auxiliary switch is ON. An auxiliary logic circuit's output is OFF at all other times. The first and second auxiliary logic circuits 70, 90 supply their respective outputs to the first and second power switches 50, 52, respectively.

First and second power switches 50, 52 are high-current switches that are activated by an ON output level from first and second auxiliary logic circuits 70, 90, respectively. When either power switch is activated, it completes an electrical circuit by connecting a power source to one of two normally grounded terminals 32, 34 of the bi-directional motor 30. The first and second power switches 50, 52 preferably are mutually exclusive so that when one is closed, the other must remain open. This prevents both terminals of the motor from simultaneously being connected to the power source which would turn off the motor. The first and second power switches 50, 52 may be made mutually exclusive by implementing one dual relay which selectively connects an input (e.g., a power source) to energize only one of two outputs (e.g., the terminals on the motor). This could also be done with H-bridge drivers implemented with FETs or BJTs, as known to those skilled in the art.

The primary and auxiliary logic circuits whose functions are described above can be implemented by using different types of components providing the same logic functions. As known by those skilled in the art, discrete analog components, integrated circuits, digital logic gates, microprocessors, programmable logic arrays and analog comparators may all be employed for this purpose.

It should also be evident to one skilled in the art that the first and second primary circuits could be combined into a single three-input, two-output circuit wherein the two outputs are tri-state outputs. Similarly, the first and second auxiliary circuits could be combined into a single four-input, two-output circuit. It makes no difference how one characterizes either the primary circuits or the auxiliary circuits; it is the input-output relationship of these circuits that counts. It should also be noted that combining either or both pairs of circuits may be done with any of the types of components listed above.

In addition, the invention may be used in any number of settings where a primary and an auxiliary operator both need to operate a high-current motor by activating only low-current switches with the primary operator being provided with the additional capability of locking out the auxiliary operator by activating a low-current lockout switch.

Figure 3:
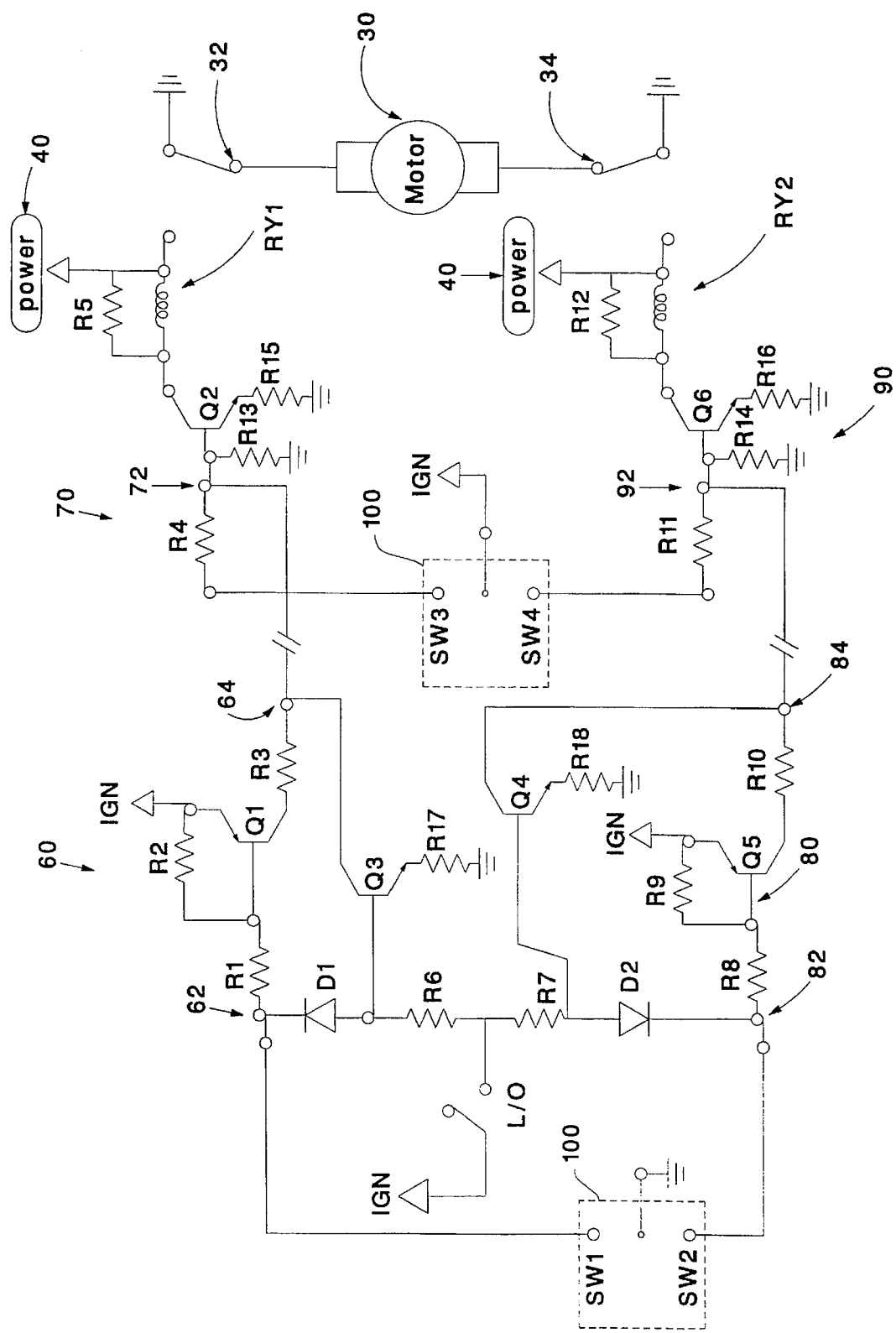
FIG. 3 is a circuit diagram in accordance with the present invention for controlling a power window motor.

FIG. 3 presents an analog implementation of the logic circuitry of the invention that is suitable for controlling a window on a passenger vehicle. Non-latching contact switches SW1 and SW2 enable the driver to operate a passenger's window (not shown) while non-latching contact switches SW3 and SW4 enable a passenger that window. The functions served by driver switches SW1 and SW2 preferably are combined into a single double throw contact rocker switch 100. The same holds for passenger switches SW3 and SW4. As known to those skilled in the art, such rocker switches are normally in a neutral position and may be selectively activated to either raise or lower a window motor.

The lockout switch L/O, preferably a single throw latching switch, is accessible only to the driver and serves to prevent the passenger from operating his window. With the lockout switch L/O not activated (open), either driver switch SW1 or passenger switch SW3 can be activated to operate the window in a first direction. Similarly, either driver switch SW2 or passenger switch SW4 can be activated to operate the window in a second, opposite direction. Without loss of generality, we will assume that activating either SW1 or SW3 causes the window to go UP (thus raising the window) and activating either SW2 or SW4 causes the window to go DOWN (thus lowering the window).

The circuit of FIG. 3 comprises the aforementioned manually operated switches, driver UP circuit, shown generally as 60, passenger UP circuit, shown generally as 70, driver DOWN circuit, shown generally as 80, passenger DOWN circuit, shown generally as 90, UP relay RY1, DOWN relay RY2 and the bi-directional motor 30 with normally grounded terminals 32, 34. Power to the overall circuit is provided via an ignition-switched power relay (not shown) whose voltage is represented by 'IGN' in FIG. 3.

The operation of the UP circuitry is described next, it being understood that the DOWN circuitry operates in substantially the same manner.

With the lockout switch L/O not activated (open or OFF), current does not flow through the current limiting UP lockout resistor R6 because UP lockout transistor Q3 is off as its base-emitter junction is not forward biased and because no voltage is applied to the anode of the UP bypass diode D1. As Q3 is off, no current flows through Q3's emitter resistor R17. Consequently, neither the driver UP input node 62 nor the driver UP output node 64 are affected by D1 cathode output or Q3 collector output, respectively, when L/O is OFF. Preferably, R6 is 10 kΩ, R17 is 47 Ω, Q3 is a BC547, available from Motorola Semiconductor, and D1 is a 1N4148, available from Phillips Semiconductor.

With L/O open and the driver UP switch SW1 not activated (open or OFF), the driver UP input node 62 and the base and emitter electrodes of the driver UP transistor Q1 are all held at a voltage of IGN. Because Q1's base-emitter junction is not reversed biased, Q1 is off and current does not flow through either Q1 current limiting resistor R1 or Q1 shunt resistor R2. Consequently, Q1's collector does not conduct and no current flows through Q1's collector resistor R3 interposed between Q1's collector and the driver UP output node 64. Because neither Q1 nor Q3 are conducting, the driver UP output node 64 is neither pulled to ground (LO), nor raised to IGN voltage (HI). Instead, it is effectively open circuited, causing the driver UP circuit 60 to output a signal having a floating level of X. Preferably, R1 is 10 kΩ, R2 is 100 kΩ and Q1 is an MPSA56, available from Motorola Semiconductor.

With L/O open and the driver UP switch SW1 activated (closed or ON), the driver UP input node 62 is grounded. Consequently, a voltage drop appears across now conducting Q1's current limiting resistor R1 and Q1's shunt resistor R2. As R1 is 10KΩ and R2 is 100KΩ, most of the voltage drop between Q1's emitter and the driver UP input node 62 is across Q1's current limiting resistor R1. This causes Q1's base to drop to about 0.6 V below IGN, reverse biasing Q1's base-emitter junction and turning on Q1. With Q1 on, a collector current flows through Q1's collector resistor R3, which is preferably 680Ω, and an emitter-collector voltage, typically 200–300 mV below IGN appears at Q1's collector. As a result, the voltage at the driver UP output node 64 is about 1.6–1.8 V, causing the driver UP circuit 60 to output a signal having a level that is HI.

When L/O is activated (closed or ON), the driver UP circuit 60 operates somewhat differently. Closing L/O causes the potential at the anode of UP bypass diode D1 to assume a voltage close to 0.8 V. This allows the base-emitter junction of Q3 to become forward biased, turning on Q3 and causing a current to flow through the current limiting UP lockout resistor R6. When it is turned on, Q3 has a very low collector-emitter voltage, pulling the driver UP output node 64 close to ground and providing a path for current to flow from the driver UP output node 64 to ground via Q3's emitter resistor R17.

With the lockout switch L/O closed and the driver UP switch SW1 open, Q1 remains off as Q1's base-emitter junction is not reversed biased, as described earlier. Furthermore, UP bypass diode D1 does not conduct as the potential at both its anode and cathode are held at IGN. And, as stated immediately above, Q3 is on, pulling down the driver UP output node 64. Under these conditions, the driver UP circuit 60 outputs a signal having a level that is LO.

For reasons stated above, with L/O closed, current flows through R6 and R17, Q3 is on and D1 is off. Q3's emitter resistor R17 ensures that Q3 will turn off even if the voltage drop across D1 drifts with temperature. R17 also forces the base-emitter turn on voltage of Q3 to increase to about 0.8 V. Therefore, when SW1 is activated, the voltage at the base of Q3 and the anode of D1 drops to about 0.6 V, thus turning off Q3. Closing driver UP switch SW1 under these conditions causes three things to happen more or less simultaneously. First, UP bypass diode D1 turns on because its cathode is grounded while its anode is connected, via R6, to the IGN voltage. Second, Q3 turns off because the voltage drop across D1 (and thus Q3's base voltage) is on the order of 0.65 V, such a low base-emitter voltage being insufficient to keep Q3 on. To this extent, UP bypass diode D1 causes Q3 to turn off when SW1 is activated. And third, driver UP transistor Q1 whose base-emitter junction is now reverse biased, begins conducting. This causes the driver UP output node 64 to assume a voltage about 1.6–1.8 V, resulting in driver UP circuit 60 to output a signal having a level that is HI.

In summary, the driver UP circuit outputs a HI signal whenever driver UP switch SW1 is activated (ON) regardless of the L/O setting, outputs a LO signal when the L/O switch is activated (ON) and SW1 is not activated (OFF), and outputs a signal of level X when both the L/O and the SW1 switches are not activated (OFF).

The output of the driver UP circuit 60 is electrically connected to the passenger UP circuit 70 at the passenger UP input node 72. UP input node 72, in turn, is connected to the base electrode of passenger UP transistor Q2. Q2's base is connected to ground by Q2's pull-down resistor R13 to ensure that leakage current does not turn on Q2. Q2's emitter is connected to ground by R15, which forces node 72 up to about 1.1 V, thus ensuring that even with a ground offset of 0.5 V, Q3 will be able to turn Q2 off. The passenger UP input node 72 also receives an input from the passenger UP switch SW3 via Q2's current limiting resistor R4. Preferably, R4 is 2.2KΩ, R13 is 33KΩ, R15 is 10 Ω and Q2 is an MPSA06, available from Motorola Semiconductor. It should be noted, however, that R15's value depends on the type of switch used (e.g., relay, FET, BJT, etc.) and the resistance associated with it.

When the driver UP circuit 60 outputs a HI signal, (i.e., the driver UP switch SW1 is ON), Q2 base-emitter junction is forward biased, turning on Q2 and causing current to flow through Q2's collector.

When the driver UP circuit 60 outputs a LO signal, (L/O ON and SW1 OFF), Q2 is off because its base-emitter junction is not forward biased. Under these conditions, closing passenger UP switch SW3 completes an electrical circuit connecting IGN at switch SW3 to ground, but does not turn on Q2. Closing switch SW3 causes current to flow from IGN through Q2's current limiting resistor R4, via the passenger UP input node 72 and the driver UP output node 64, through Q3's collector and then to ground via Q3's emitter resistor R17. The path via Q3 is made possible by the fact that Q3 is on when the L/O switch is activated and SW1 is open. And because Q3's collector voltage is lower than Q2's base-emitter turn-on voltage, a passenger cannot turn on Q2 when the L/O switch is closed.

When the driver UP circuit 60 outputs a signal with a floating level of X, (both L/O and SW1 are OFF), Q2 is again off because its base-emitter junction is not forward biased. Under these conditions, closing passenger UP switch SW3 completes an electrical circuit connecting IGN at switch SW3 to Q2's current limiting resistor R4. This forward biases Q2's base-emitter junction, thus turning on Q2 and causing a current to flow through Q2's emitter resistor R15 to ground. This time, however, as the L/O switch is not activated, Q3 does not turn on and current cannot flow to ground via Q3.

As set forth in the preceding three paragraphs, Q2 is turned on when either the driver activates SW1 or the passenger activates SW3 with the L/O switch open. Turning on Q2 causes a current to flow through Q2's collector and activates the power switch by either energizing a relay coil or turning on a solid state power switch (i.e., FET or BJT). In the preferred embodiment, Q2's load resistor R5 is shunted across a pair of input terminals to UP relay RY1, reducing inductive spikes from the relay coil. Preferably, R5 is 820Ω and RY1 is 225Ω.

In this circuit, RY1 serves as a high-current power switch, closing a connection from IGN to a first terminal 32 of the bi-directional motor 30, causing the motor to raise the corresponding passenger window (not shown) when Q2 is turned on. The window is operated by energizing bi-directional motor 30 whose first and second terminals 32, 34 are normally grounded. Energizing UP relay RY1 by turning on Q2 allows current to flow in one direction from IGN through the first motor terminal 32, through the bi-directional motor 30 and therefrom to ground via the second motor terminal 34.

Preferably, UP relay RY1 and its counterpart DOWN relay RY2 are mutually exclusive so that as long as RY1 is closed, RY2 remains open. This prevents both first and second motor terminals 32, 34 from being connected to the power source at the same time. This function can be achieved by employing a dual relay such as part number EP2-3N1S, available from NEC, familiar to those skilled in the art of analog circuit design. Two single relays with appropriate lockout circuitry may also be used for this purpose.

It should be clear from the symmetrical nature of FIG. 3 that lowering the passenger window works in substantially the same manner. Driver DOWN circuit, shown generally as 80, uses driver DOWN switch SW2, DOWN lockout resistor R7, DOWN bypass diode D2, DOWN lockout transistor Q4, Q4 emitter resistor R18, driver DOWN input node 82, driver DOWN transistor Q5, driver DOWN output node 84, Q5's current limiting resistor R8, Q5's shunt resistor R9 and Q5's collector resistor R10 in place of the corresponding driver UP circuit components.

Passenger DOWN circuit, shown generally as 90, is similarly comprised of passenger DOWN switch SW4, passenger DOWN transistor Q6, passenger DOWN input node 92 connected to Q6's base, Q6's pull-down resistor R14, Q6's current limiting resistor R11, Q6 emitter resistor R16, Q6's base load resistor R12, and DOWN relay RY2. Closing RY2 by activating either SW2 or SW4 with the L/O switch not activated connects IGN to the second terminal 34 of the bi-directional motor 30. The components in the DOWN circuitry are identical to those in the UP circuitry whose operation is detailed above.

It will be obvious to one skilled in the art that trivial substitutions can be made to the various components in the circuit of FIG. 3. For instance, FETs could be used in place of the bipolar junction transistors, appropriately biased transistors could be used in place of bypass diodes D1 and D2, and the PNP and NPN transistors can be replaced with NPN and PNP transistors, respectively, with appropriate changes in the various polarities.

It will also be obvious to one skilled in the art that although the driver UP and driver DOWN circuits and the passenger UP and passenger DOWN circuits have been cast as discrete subsystems of the invention, this characterization is not critical. The driver UP and driver DOWN circuits are symmetric as are the passenger UP and passenger DOWN circuits. Therefore, without changing either the spirit or scope of the present invention, the driver UP and driver DOWN circuits can be recast as a single three-input (lockout and the two driver switches), two-output circuit. Similarly, the passenger UP and the passenger DOWN circuits can be recast as a single four input (two outputs from the driver circuit and the two passenger switches), two output circuit. Recasting the above implementation in this manner preserves the objectives of the present invention.

The above analog component implementation realizes the various advantages of the present invention. First, all high-current switching for providing power to the motor 30 is performed by relays RY1 and RY2 which are not directly activated by either the driver or the passenger. Second, the only switches activated by either the driver or the passenger are low current switches conducting currents on the order of 20 mA as opposed to the 10–25 amps required to drive the motor. Third, when the L/O switch is activated (ON), a LO signal appears at both the Q2 base input 72 and the Q6 base input 92. This prevents the passenger from raising (by activating SW3) or lowering (by activating SW4) the window. Now, should the driver wish to raise (or lower) either window, he may do so without enabling the passenger to lower (or raise) that window. This prevents undesirable interference by the passenger when the passenger is locked out.

As known to those skilled in the art, one may construct a switch system having a plurality of the circuits of FIG. 3 and provide the driver with a common lockout switch. Such a system is suitable in settings where a number of windows, each operable by a separate set of primary and auxiliary switches, must be controlled. A familiar example of this is a passenger vehicle having a driver window and three passenger windows, the latter provided with switches operable by either the driver or the various passengers with the driver further provided with a lockout switch. Providing a single, common lockout switch permits the driver to disable all the auxiliary switches at once while retaining the ability to operate any one or more of them in the manner discussed above. Needless to say, there is no theoretical limit to the number passenger windows that can be controlled; one need only incorporate one such circuit per passenger window to be controlled.

While the circuit diagram presented in FIG. 3 is intended for controlling a passenger window, there is no reason why such a circuit cannot be employed in other settings as well. In general, the invention may be employed in any setting calling for a primary operator and a plurality of auxiliary operators to use low-current switches to indirectly activate a high-current switch to operate a bi-directional motor wherein the primary operator is also provided with a low-current lockout switch. One such application is the control of power door locks in a passenger vehicle wherein a solenoid or other actuator movable between a locked and an unlocked state is controlled in a similar manner by the circuitry described above. Again, all high-current power switching is performed at the actuator by a relay or the like while the driver and the passenger operate only low current switches.

While there has been described what is at present considered to be a preferred embodiment of this invention, it will be clear to those skilled in art that various changes and modifications may be made without departing from the invention which is intended to cover all such changes and modifications as fall within the true spirit and scope of the claims set forth hereunder.

What is claimed is:

1. An electrical circuit for selectively activating a bi-directional motor in a first or a second direction comprising:

a power source;

a bi-directional motor having a first and a second motor terminal;

a lockout switch switchable between an ON and an OFF position, said lockout switch outputting a lockout signal reflective of said lockout switch position;

a first primary switch switchable between an ON and an OFF position, said first primary switch outputting a first primary signal reflective of said first primary switch position;

a second primary switch switchable between an ON and an OFF position, said second primary switch outputting a second primary signal reflective of said second primary switch position;

a first auxiliary switch switchable between an ON and an OFF position, said first auxiliary switch outputting a first auxiliary signal reflective of said first auxiliary switch position;

a second auxiliary switch switchable between an ON and an OFF position, said second auxiliary switch outputting a second auxiliary signal reflective of said second auxiliary switch position;

a primary circuit having means for supplying a first tri-state signal having a level responsive to said lockout signal and said first primary signal, and a second tri-state signal having a level responsive to said lockout signal and said second primary signal;

an auxiliary circuit having means for supplying a first switching signal having a level responsive to said first auxiliary signal and said first tri-state signal, and a second switching signal having a level responsive to said second auxiliary signal and said second tri-state signal;

a first power switch for connecting said power source to said first motor terminal in response to said first switching signal;

a second power switch for connecting said power source to said second motor terminal in response to said second switching signal;

wherein said bi-directional motor is operated in said first direction by switching ON one of said first primary switch and said first auxiliary switch and said bi-directional motor is operated in said second direction by switching ON one of said second primary switch and said second auxiliary switch, said first and second auxiliary switches causing said motor to operate only when said lockout switch is OFF.

2. The electrical circuit of claim 1 wherein said first tri-state signal is HI when said first primary signal is ON, said first tri-state signal is LO when said first primary signal is OFF and said lockout signal is ON, and said first tri-state signal is 'X' when said first primary signal is OFF and said lockout signal is OFF, and said second tri-state signal is HI when said second primary signal is ON, said second tri-state signal is LO when said second primary signal is OFF and said lockout signal is ON, and said second tri-state signal is 'X' when said second primary signal is OFF and said lockout signal is OFF.

3. The electrical circuit of claim 1 wherein said first switching signal is ON when said first tri-state signal is HI, said first switching signal is OFF when said first tri-state signal is LO, and said first switching signal is ON when said first tri-state signal is 'X' and said first auxiliary signal is ON, and said second switching signal is ON when said second tri-state signal is HI, said second switching signal is OFF when said second tri-state signal is LO, and said second switching signal is ON when said second tri-state signal is 'X' and said second auxiliary signal is ON.

4. The electrical circuit of claim 1 wherein said first and second power switches are mutually exclusive.

5. The electrical circuit of claim 4 wherein said first and second power switches are combined into a dual relay.

6. The electrical circuit of claim 1 wherein said first and second primary switches are mutually exclusive and said first and second auxiliary switches are mutually exclusive.

7. The electrical circuit of claim 1 wherein said first and second primary switches are combined into a primary double throw contact rocker switch and said first and second auxiliary switches are combined into an auxiliary double throw contact rocker switch.

8. The electrical circuit of claim 1 wherein said primary circuit further comprises a first primary circuit having means for supplying said first tri-state signal having a level responsive to said lockout signal and said first primary signal, and a second primary circuit having means for supplying said second tri-state signal having a level responsive to said lockout signal and said second primary signal.

9. The electrical circuit of claim 1 wherein said auxiliary circuit further comprises a first auxiliary circuit having means for supplying said first switching signal having a level responsive to said first tri-state signal and said first auxiliary signal, and a second auxiliary circuit having means for supplying said second switching signal having a level responsive to said second tri-state signal and said second auxiliary signal.

10. An electrical circuit for controlling a passenger window in a passenger vehicle comprising:

a power source;

a window motor having first and second motor terminals;

a driver lockout switch switchable between an ON and an OFF position, said lockout switch outputting a lockout signal reflective of said lockout switch position;

a normally neutral driver switch selectively switchable from said neutral position to one of an UP position and a DOWN position, said driver switch outputting a driver UP signal reflecting said driver switch being in said UP position and said driver switch outputting a driver DOWN signal reflecting said driver switch being in said DOWN position;

a normally neutral passenger switch selectively switchable from said neutral position to one of an UP position and a DOWN position, said passenger switch outputting a passenger UP signal reflecting said passenger switch being in said UP position and said passenger switch outputting a passenger DOWN signal reflecting said passenger switch being in said DOWN position;

a driver UP circuit having means for supplying an UP tri-state signal, said UP tri-state signal having a level responsive to said lockout signal and said driver UP signal;

a driver DOWN circuit having means for supplying a DOWN tri-state signal, said DOWN tri-state signal having a level responsive to said lockout signal and said driver DOWN signal;

a passenger UP circuit having means for supplying an UP switching signal having a level responsive to said UP tri-state signal and said passenger UP signal;

a passenger DOWN circuit having means for supplying a DOWN switching signal having a level responsive to said DOWN tri-state signal and said passenger DOWN signal;

an UP power switch for connecting said power source to said first window motor terminal in response to said UP switching signal;

a DOWN power switch for connecting said power source to said second window motor terminal in response to said DOWN switching signal;

wherein said window motor is operated by activating one of said driver switch and said passenger switch, said passenger switch causing said window motor to operate only when said lockout switch is OFF.

11. The electrical circuit of claim 10 wherein said driver UP circuit means comprises a driver UP input node receiving an input from said driver UP signal, a driver UP output node, a driver UP transistor interposed between said driver UP input node and said driver UP output node, said driver UP transistor supplying a driver UP transistor signal responsive to said driver UP signal.

12. The electrical circuit of claim 11 wherein said driver UP circuit means further comprises a shunt resistor interposed between a base electrode and an emitter electrode of said driver UP transistor.

13. The electrical circuit of claim 11 wherein said driver UP circuit means further comprises an UP lockout transistor supplying an UP lockout transistor signal to said driver UP output node, said UP lockout transistor signal having a level responsive to said lockout signal, and an UP bypass diode for disabling said UP lockout transistor, said UP bypass diode responsive to said driver UP signal.

14. The electrical circuit of claim 10 wherein said driver DOWN circuit means comprises a driver DOWN input node, a driver DOWN output node, a driver DOWN transistor interposed between said driver DOWN input node and said driver DOWN output node, said driver DOWN transistor supplying a driver DOWN transistor signal responsive to said driver DOWN signal.

15. The electrical circuit of claim 14 wherein said driver DOWN circuit means further comprises a shunt resistor interposed between a base electrode and an emitter electrode of said driver DOWN transistor.

16. The electrical circuit of claim 14 wherein said driver DOWN circuit means further comprises a DOWN lockout transistor supplying a DOWN lockout transistor signal to said driver DOWN output node, said DOWN lockout transistor signal having a level responsive to said lockout signal, and a DOWN bypass diode for disabling said DOWN lockout transistor, said DOWN bypass diode responsive to said driver DOWN signal.

17. The electrical circuit of claim 10 wherein said passenger UP circuit means comprises a passenger UP input node receiving a first input from said passenger UP signal and a second input from said UP tri-state signal, an output node supplying said UP switching signal, and a passenger UP transistor interposed between said passenger UP input node and said passenger UP output node.

18. The electrical circuit of claim 10 wherein said passenger DOWN circuit means comprises a passenger DOWN input node receiving a first input from said passenger DOWN signal and a second input from said DOWN tri-state signal, an output node supplying said DOWN switching signal, and a passenger DOWN transistor interposed between said passenger DOWN input node and said passenger DOWN output node.

19. An electrical circuit for controlling a passenger window in a passenger vehicle comprising:

a power source;

a window motor having first and second motor terminals;

a driver lockout switch switchable between an ON and an OFF position, said lockout switch outputting a lockout signal reflective of said lockout switch position;

a normally neutral driver switch selectively switchable from said neutral position to one of an UP position and a DOWN position, said driver switch outputting a driver UP signal reflecting said driver switch being in said UP position and said driver switch outputting a driver DOWN signal reflecting said driver switch being in said DOWN position;

a normally neutral passenger switch selectively switchable from said neutral position to one of an UP position and a DOWN position, said passenger switch outputting a passenger UP signal reflecting said passenger switch being in said UP position and said passenger switch outputting a passenger DOWN signal reflecting said passenger switch being in said DOWN position;

a driver circuit having means for supplying an UP tri-state signal, said UP tri-state signal having a level responsive to said lockout signal and said driver UP signal, and a DOWN tri-state signal, said DOWN tri-state signal having a level responsive to said lockout signal and said driver DOWN signal;

a passenger circuit having means for supplying an UP switching signal having a level responsive to said UP tri-state signal and said passenger UP signal, and a DOWN switching signal having a level responsive to said DOWN tri-state signal and said passenger DOWN signal;

an UP power switch for connecting said power source to said first window motor terminal in response to said UP switching signal;

a DOWN power switch for connecting said power source to said second window motor terminal in response to said DOWN switching signal;

wherein said window motor is operated by activating one of said driver switch and said passenger switch, said passenger switch causing said window motor to operate only when said lockout switch is OFF.

20. The electrical circuit of claim 10 wherein said first and second motor terminals are normally grounded.

\* \* \* \* \*